United States Patent
Zuidema et al.

(10) Patent No.: US 9,507,161 B2
(45) Date of Patent: Nov. 29, 2016

(54) OPTICAL BEAM DEFLECTION ARRANGEMENT AND MULTI-VIEW DISPLAY HAVING THE SAME

(75) Inventors: Hans Zuidema, Eindhoven (NL); Jan Van Der Horst, Eindhoven (NL)

(73) Assignee: KONINKLIJKE PHILIPS ELECTRONICS N.V., Eindhoven (NL)

(*) Notice: Subject to any disclaimer, the term of this patent is extended or adjusted under 35 U.S.C. 154(b) by 138 days.

(21) Appl. No.: 13/812,196

(22) PCT Filed: Jul. 27, 2011

(86) PCT No.: PCT/IB2011/053351
§ 371 (c)(1),
(2), (4) Date: Jan. 25, 2013

(87) PCT Pub. No.: WO2012/014169
PCT Pub. Date: Feb. 2, 2012

(65) Prior Publication Data
US 2013/0120837 A1    May 16, 2013

(30) Foreign Application Priority Data
Jul. 28, 2010 (EP) .................................. 10171091

(51) Int. Cl.
*G02B 27/22* (2006.01)
*G02B 3/00* (2006.01)
(Continued)

(52) U.S. Cl.
CPC ........... *G02B 27/2214* (2013.01); *G02B 3/005* (2013.01); *G02B 3/0043* (2013.01);
(Continued)

(58) Field of Classification Search
CPC  G02B 27/2214; G02B 27/22; G02B 3/0087; H04N 13/0404
USPC ......................................... 359/462, 463, 477
See application file for complete search history.

(56) References Cited

U.S. PATENT DOCUMENTS 6,064,424 A    5/2000  Van Berkel
6,069,650 A    5/2000  Battersby
(Continued)

FOREIGN PATENT DOCUMENTS

EP    1566683 B1   12/2008
GB    2196166 A    4/1998
(Continued)

OTHER PUBLICATIONS

Harrold, Jonathan et al Autostereoscopic Display Technology for Mobile 3DTV Applications, SPIE, vol. 6490A-19, 2007.

*Primary Examiner* — Jade R Chwasz (57) ABSTRACT

There is disclosed an optical beam deflection arrangement which may be used in an autostereoscopic display device. The arrangement comprises a substrate; a first layer, for example formed of an optically isotropic solid and having a curved surface facing towards the substrate; and a second layer, for example formed of a liquid crystal material confined between the substrate and the first layer. An interface between the first and second layers may, for example, define an array of parallel lenticulars. A refractive index of the second layer, for light of a predetermined polarization, maybe switchable between a first value matching the refractive index of the first layer and a second value different to the refractive index of the first layer, to thereby selectably provide a beam deflection function. The substrate is spaced from the first layer by a plurality of spacers which are extended from the substrate or from the first layer, the spacers making point or line contact with the other one of the substrate and the first layer. The spacers may comprise elongate spacers having a length direction parallel to the plane of the substrate. The substrate and the first layer may be formed of flexible plastics materials, in which case the arrangement may be manufactured using roll-to-roll processing techniques.

20 Claims, 7 Drawing Sheets

(51) Int. Cl.
*G03B 35/18* (2006.01)
*H04N 13/04* (2006.01)

(52) U.S. Cl.
CPC ......... *G03B 35/18* (2013.01); *H04N 13/0404* (2013.01); *H04N 13/0447* (2013.01); *H04N 13/0454* (2013.01); *H04N 13/0415* (2013.01); *H04N 2013/0463* (2013.01); *H04N 2013/0465* (2013.01)

(56) References Cited

U.S. PATENT DOCUMENTS

| | | | |
|---|---|---|---|
| 6,292,294 | B1 | 9/2001 | Takahashi |
| 7,058,252 | B2 | 6/2006 | Woodgate |
| 7,365,707 | B2 | 4/2008 | Schobben |
| 2006/0152812 | A1 | 7/2006 | Woodgate |
| 2008/0186572 | A1* | 8/2008 | Tomikawa ......... G02B 27/2214 359/462 |
| 2009/0122210 | A1 | 5/2009 | Im |
| 2009/0244270 | A1* | 10/2009 | Takagi et al. ................... 348/58 |

FOREIGN PATENT DOCUMENTS

| | | |
|---|---|---|
| GB | 2403815 A | 1/2005 |
| JP | 9203980 A | 8/1997 |
| JP | 9304740 A | 11/1997 |
| JP | 2007133037 A | 5/2007 |
| WO | 9821620 A1 | 5/1998 |
| WO | 2005006056 A1 | 1/2005 |

\* cited by examiner

OPTICAL BEAM DEFLECTION
ARRANGEMENT AND MULTI-VIEW
DISPLAY HAVING THE SAME

FIELD OF THE INVENTION

This invention relates to an optical beam deflection arrangement of the type in which light is refracted at an interface between a solid material and a gaseous/liquid material. where the arrangement comprises a substrate, a first layer formed of an optically transparent solid material, having a first refractive index and having curved surfaces facing towards the substrate and a second layer formed of a gaseous and/or liquid material confined between the substrate and the first layer and having a second refractive index, wherein the second refractive index is different from the first refractive index.

The invention further relates to a multi-view display comprising the optical beam deflection arrangement. In which case the arrangement is configured to receive light from a display device having sub-pixels and project the light of different sub-pixels in different directions and into different ones of the multiple views.

The invention also relates to a method of forming the optical beam deflection arrangement.

BACKGROUND OF THE INVENTION

An autostereoscopic display device is described in GB 2196166 A. This known device comprises a two dimensional emissive liquid crystal display panel having a row and column array of display sub-pixels acting as an image forming arrangement to produce a display. An array of elongate lenticulars (lenses) extending parallel to one another overlies the display sub-pixel array and acts as an optical beam deflection arrangement. Outputs from the display pixels are projected through these lenticulars, which lenticulars operate to form the outputs into a plurality of views.

In accordance with general definition and for purpose of the present invention a pixel is meant to represent the smallest unit of a display panel for representing an image point. Thus in color displays a pixel is able to provide all colors to an image point and may therefore be subdivided into sub-pixels representing elementary or primary colors such as red green and blue. Additional sub-pixels in the form of additional primary color sub-pixels or a white pixel may be present. For a monochrome display a sub-pixel thus corresponds to a pixel as there are no colors.

The optical view beam deflection arrangement of the GB 2196166 A is thus provided as a sheet of elements, each of which comprises an elongate semi-cylindrical lens element. The lenticulars extend in the sub-pixel column direction of the display panel, with each lenticular overlying a respective group of two or more adjacent columns of display subpixels. A focal point of each lens coincides approximately with a plane defined by the array of display pixels.

In an arrangement in which, for example, each lenticular is associated with two columns of display sub-pixels, the display sub-pixels in each column provide a vertical slice of a respective two dimensional sub-image. The lenticular sheet projects these two slices and corresponding slices from the display pixel columns associated with the other lenticulars, to the left and right eyes of a user positioned in front of the sheet, so that the user observes a single stereoscopic image. For the regular display panel pixel layout having columns of red, green and blue sub-pixels, three neighboring lenticulars in the row direction provide two views each having red and green and blue sub-pixel output.

In other arrangements, each lenticular is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are observed creating, for example, a look-around impression.

The above described device provides an effective three dimensional display. However, it will be appreciated that the provision of stereoscopic views involves a necessary reduction in resolution, since each view is formed by a subset of the sub-pixels of the display panel. Furthermore, for a given display panel resolution, there is a trade off between the realistic perception of three dimensional depth, as determined by the number of views, and the resolution of each of the views.

It has been proposed to provide a display device which is switchable in use to function as a conventional two dimensional display device and an autostereoscopic display device. In such a device, the optical beam deflection arrangement is essentially switched between first and second modes. The first mode is a pass through mode in which light received by the arrangement is transmitted substantially without having its direction altered. The second mode is a view forming mode in which the light is directed in different directions to form the stereoscopic views. Use of the optical beam deflection arrangement in the first (pass through) mode is suited to applications favoring high display resolution, such as text display. Use of the arrangement in the second (view forming) mode is suited to applications favoring a three dimensional effect, such as video display.

A known switchable optical beam deflection arrangement is disclosed in international patent application WO1998/021620. It comprises an array of lenticulars arranged such that the lenticular surfaces are defined on one side by a birefringent material and on the other side by an optically isotropic material. The refractive index of the isotropic material is matched to the ordinary refractive index or to the extraordinary refractive index of the birefringent material so that light of a first polarization is not deflected by the lenses and light of a second polarization is deflected. The lens function can then be switched on and off by appropriately controlling the polarization of light received by or transmitted from the optical beam deflection arrangement. The birefringent material is typically a liquid crystal material.

There is a need for an improved optical beam deflection arrangement, to be used in e.g. multi view displays in terms of optical performance when it contains a liquid and/or gaseous layer.

SUMMARY OF THE INVENTION

It is an object of the invention to fulfill the aforementioned need.

This object is achieved by the invention as defined in the independent claims. The dependent claims provide advantageous embodiments.

The invention provides an optical beam deflection arrangement wherein the substrate surface is spaced from the curved surfaces of the first layer by a plurality of spacers which are extended from the substrate and/or from the first layer, and wherein each of the plurality of spacers make point or line contact with the other one of the substrate and the first layer.

The performance of the optical arrangement is enhanced, since it can be ensured that substantially the whole of the deflecting surface of the first layer is in contact with the gaseous or liquid material of the second layer, with the point and/or line contact of the spacers minimizing the area where such contact is absent. As a consequence, the visibility (optical effect) of the areas where the spacers contact the deflection surface is minimized and hence also the visibility of the spacers is minimized.

At the same time the construction of the optical beam deflection arrangement incorporating the specific spacers allows that the substrate surface and the first layer have a defined distance from each other. Hence, the second layer of the arrangement may be provided with a more consistent thickness, which consistency may even reduce further optical defects.

Furthermore, the complexity of the arrangement is minimized by providing spacers which are extended from (e.g. integral with or joined to) the substrate or the first layer. This provides advantages over arrangements comprising discrete spacers such as balls or cylindrical members, particularly with respect to manufacture of the arrangement. It will be understood that the spacers of the invention are not balls or cylindrical members with circular cross-section.

The optical beam deflection surface is made up of a plurality of smaller curved surfaces. These curved surfaces may be prisms, or concave and/or convex lenses or lenticules. Preferably, they are single prisms, lenses or lenticules. The plurality of curved surfaces preferably is an array of curved surfaces. The array may be regular in one or two (optionally mutually perpendicular) directions in which the array extends in. In this way the curved surface represents an array of repeating curved surfaces such as a lenticular sheet having an array of lenticules.

The substrate and/or the first layer may be formed of flexible materials, such as e.g. plastic materials or (organic) polymeric materials. Examples of such materials include polycarbonate or the materials as found in display panels of e.g. liquid crystal display (LCD) panels of laptops or handheld devices. In these cases having spacers may be necessary when the second layer comprises non-solid materials such as gas and/or liquid during manufacture or in the final state of the arrangement, In a first embodiment the invention provides an optical beam deflection arrangement of the type in which light is refracted at an interface between a solid material being the first layer material and a second layer comprising or consisting of gaseous and/or liquid material. In this case the second layer in the final state of the arrangement comprises a liquid and/or a gas. Thus, the invention is advantageous as it enlarges the range of materials to be used for the second layer towards the liquids, liquid mixtures and gases. This advantage is especially pronounced for optical arrangements where the second layer is used to switch its refractive index.

Thus, where the liquids and or gases have a further refractive index that differs from the second refractive index but is the same as the first refractive index, the arrangement of the invention may be switchable between two optical states. A first state is then associated with the second layer providing the second refractive index at the deflecting surface and a second state is then associated with the second layer providing the further refractive index at the deflecting surface.

Alternatively, the second and further refractive index may both be different from the first refractive index and be different from each other, so that the arrangement provides two differing optical beam deflection modes.

Preferably the second layer comprises a liquid material having the second and further refractive index. Such a material may be a liquid crystal material. In that way the refractive index of the second layer may be switched between the second and further refractive index by application of an electric field to the second layer using e.g. electrodes on one or more portions of one or more sides of the optical beam deflection surface. Each of the curved surfaces may have a first portion where the curved surface is spaced from the substrate surface with a minimum local distance, and wherein the spacers are extending from the substrate so that for a first subset of the curved surfaces the line and/or point contact occurs in the first portions within the first subset of curved surfaces. In this way the contact is always on top of the contacting curved surfaces. The arrangement may be used with a polarizer for providing light having the predetermined polarization, but such a polarizer may already be present in another part of the device in which the arrangement is used.

In a preferred embodiment the minimum local distance is the same as the minimum spacing distance between the substrate surface and a first portion of a curved surface of the optical beam deflection surface. Also the curved surfaces that make contact are mutually identical. In this configuration the spacers may be elongate spacers with a uniform height such that spacing of the substrate towards the first layer is uniform.

The spacers may thus be elongate spacers having a length direction which extends parallel to the plane of the substrate. Thus the spacers my make contact with multiple curved surfaces.

The curved surfaces preferably is a semi cylindrical lens having a cylinder axis, all cylinder axes of the lenses being parallel and defining a non-zero angle with the spacer length direction. Preferably the elongate spacers make contact with multiple curved surfaces and their length axes define an angle with the cylindrical axes of the lenticular lenses. In this way the spacers make only point contact with the lenticulars and the contact between the substrate and the first layer can be minimized. At the same time the substrate and first layer need no exact alignment to have o good and uniform spacing configuration for the optical beam deflection arrangement. This facilitates manufacture considerably. At the same time a margin for bending of the whole arrangement without substantial alteration of the spacing value is created.

The angle between the spacers and the lenticulars may be any angle other than zero degrees, but preferably lies in the range 2 to 90 degrees, or more particularly the range 15 to 80 degrees.

The spacers (41) have a spacer height measured from the surface it extends from and a spacer thickness perpendicular to the spacer height, the spacer height and spacer thickness spanning a spacer cross-section, wherein the spacer thickness decreases with increasing spacer height in a linear relation, or a less than linear relation or a more than linear relation, but less than a relation as defined by a circular spacer cross-section. As long as the spacers make point or line contact, they may have any cross sectional shape, including shapes having tapered sides and/or rounded sides and/or terminating in a point for minimizing the contact area. For example, the spacers may have a parabolic or triangular cross section.

Where the cross sectional shape of the spacers terminates in a point, the contact is characterized as "Hertz" contact, and this arrangement is preferred as the distance between substrate and first layer in the areas in the vicinity of such contact are relatively large, so that for example liquid crystal material of the second layer in these areas will be less hampered during altering of its orientation for switching of the optical beam deflection arrangement.

The surface of the substrate which faces towards the first layer may be planar (flat). Alternatively, this surface may be curved or have other shapes as will be described here below in relation to other embodiments.

In the context of the optical beam deflection arrangement and the systems incorporating it, the terms gaseous or liquid material are meant to define that these materials have these properties during at least part of the temperature range within which the optical beam manipulation arrangement is manufactured and/or operated.

The spacers ensure that substantially the whole of the surface of the first layer is surrounded by the birefringent material of the second view forming layer, even at a portion which is closest to the substrate. In this way, the beam deflection function can be effectively switched over the substantially the whole of the surface of the first layer.

The surfaces of the substrate and/or the first layer which are in contact with the liquid crystal material of the second layer may be provided with alignment microstructures for aligning an optical axis of the liquid crystal material in a first predetermined orientation. The microstructures may comprise a mechanically rubbed-Polyimid layer. The alignment microstructures may be aligned with the elongate spacers to simplify processing of the surfaces and provide improved alignment performance.

The substrate may also comprise a transparent electrode layer, such as indium tin oxide (ITO), which may face towards the second layer. The electrode layer may be used for providing an electric field across the second layer for inducing a change in the orientation of the liquid crystal material, to thereby alter the refractive index of the liquid crystal material for light having the predetermined polarization. The spacers may be wholly defined by the electrode layer (and any overlying layer provided with alignment microstructures). Alternatively, the spacers may be defined by an additional structural layer underlying or overlying the electrode layer.

In a second group of embodiments, the spacers are extended from the first view forming layer and make point or line contact with a surface of the substrate. In this case, the spacers may be extended from the first view forming layer between adjacent ones of the lenticulars, such that they do not form a part of the lenticular surface. The spacers may be parallel elongate spacers extending parallel to the mechanical axes of the lenticulars.

The elongate spacers may have a width which is less than the width of the lenticulars, for example less than 20% or less than 10% of the width of the lenticulars. As long as the spacers make point or line contact, they may have any cross sectional shape, including shapes having tapered sides and/or terminating in a point for minimizing the contact area. Where the cross sectional shape of the spacers terminates in a point, the contact is characterized as "Hertz" contact, and this arrangement is preferred.

In any of the embodiments described hereinabove, the substrate may be a flexible substrate, for example formed of a plastics material. The first layer may also be formed of a flexible plastics material, which then enables efficient roll-to-roll processing techniques be used to manufacture the view forming arrangement. Embodiments may further comprise a second flexible substrate, for example formed of a plastics material and/or provided with a second transparent electrode layer, arranged on the non-lens surface of the first layer. A flexible optical beam deflection arrangement of this type may be laminated to a more rigid substrate, for example formed of glass, for support.

The invention also provides a multi-view display device comprising: an image forming arrangement having a planar array of light emissive display pixels for producing a display; and the optical beam deflection arrangement described above, arranged in registration with the image forming arrangement to direct light from different pixels towards different ones of the multi-views.

The image forming arrangement may comprise a liquid crystal display (LCD) device which provides a polarized light output. Alternatively, other types of image forming arrangements may be used including plasma, cathode ray, light emitting diode (LED) or organic light emitting diode displays (OLED). When required by the optical beam deflection arrangement as based on its operation, polarizer's may be present to polarize the display output of the relevant image forming arrangement.

The spacers may be located at the positions of the black matrix of a the image forming arrangement such as that of a regular LCD or OLED panel, since then the spacers are not located at light outputting parts of pixels that provide the displayed image and thus the spacers will be less visible.

For the multi-view display preferably the optical beam deflection arrangement has the curved surface such that it defines a two dimensional array of lenticulars, each of the lenticulars being e.g. a semi-cylinder, or a one dimensional array of parallel elongated lenticulars each having e.g. the shape of a semi-cylinder. The lenticulars may then be oriented with respect to the image forming arrangement such that the lenticular long axes are parallel or slanted with the columns of pixels or sub-pixels of the image forming arrangement. Slanting may be used to define 3D pixel shape or reduce banding. Examples of slanting of the lenticulars with respect to pixel columns to arrive at these effects is described in detail in WO 12998/021620 or EP1566683B1, which documents are herewith incorporated by reference in their entirety. When slanting is used, it is thus advantageous to apply the present invention such that the spacers are extending parallel to the pixel columns of the image forming arrangement, optionally positioned over and along the black matrix, while the angle of the spacers with the parallel lenticulars of the optical beam deflection arrangement is an angel suitable for slanting to reduce the banding and/or optimize the 3D pixel shape as described in the aforementioned documents. Here 3D pixel shape is the layout of pixel as perceived by the viewer viewing the multi-view mode of the display.

According to another aspect of the invention, there is provided a method of forming an optical beam deflection arrangement, the method comprising:

providing a substrate;

arranging a first layer in a spaced relationship over the substrate, the first layer being formed of an optically transparent solid having a first refractive index and having a curved surface facing towards the substrate; and     filling a space between the substrate and the first layer with a gaseous and/or liquid material to form a second layer having a second refractive index, wherein the second refractive index is different from the first refractive index, and wherein the substrate is spaced from the curved surface of the first layer by a plurality of spacers which are extended from the substrate or from the first layer, the spacers making point or line contact with the other one of the substrate and the first layer.

The substrate and the first layer may be formed of flexible plastics materials, in which case the arrangement may be formed by roll-to-roll processing techniques.

Further features and advantages of the invention will become apparent from the detailed description of the invention hereinbelow.

BRIEF DESCRIPTION OF THE DRAWINGS

Specific embodiments of the invention will now be described, with reference to the accompanying drawings, in which.

DETAILED DESCRIPTION OF EMBODIMENTS

The invention provides an optical beam deflection arrangement comprising a substrate, a first layer formed of an optically transparent solid material, and a second layer formed of a gaseous and/or liquid material confined between the substrate and the first layer. The first layer has a first refractive index and has a curved surface facing towards the substrate. The second layer has a second refractive index different from the first refractive index. The substrate is spaced from the curved surface of the first layer by a plurality of spacers which are extended from the substrate or from the first layer. The spacers make point or line contact with the other one of the substrate and the first layer.

As used herein, the concept of matching refractive indices generally refers not only to identical refractive indices, but also to refractive indices which are sufficiently close to each other for an interface between media having the respective indices to provide practically no noticeable deflection. The phrase "extended from" may include structures which are integrally formed or joined together to provide a unitary structure.

Specific embodiments of the invention provide a switchable view forming arrangement for an autostereoscopic display device. In these embodiments, which are described hereinbelow, the curved surface of the first layer defines an array of lenticulars. Furthermore, the second layer is formed of a birefringent liquid crystal material and has a further refractive index different from the second refractive index. The further refractive index matches the first refractive index of the first layer. The refractive index of the second layer, for light of a predetermined polarization, can be directly switched between the second index and the further index by using an electric field inducing a change in the alignment of the liquid crystal material of the second layer.

Figure 1:
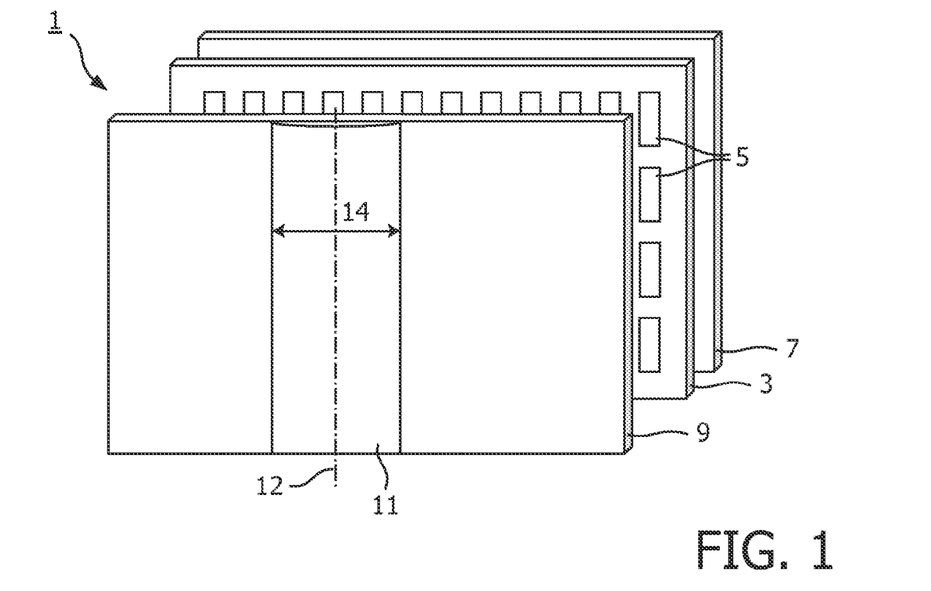
FIG. 1 is a schematic view of a known autostereoscopic display device.

FIG. 1 is a schematic perspective view of a known multi-view autostereoscopic display device 1. The known device 1 comprises a liquid crystal display panel 3 of the active matrix type that acts as an image forming means to produce the display.

The display panel 3 has an orthogonal array of display pixels 5 arranged in rows and columns. These may be sub-pixels of a color display or pixels of a monochrome display. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes and liquid crystal alignment microstructures on their facing surfaces. Polarizing layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes and a black matrix arrangement provided on the front of the panel 3. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticulars 11 extending parallel to one another in the column direction of the display panel 3, of which only one is shown with exaggerated dimensions for the sake of clarity. The lenticulars 11 have focal points which approximately coincide with a plane of the display panel 3 and act as view forming elements to perform a view forming function. The lenticulars have a long axis 12 and a width 14.

The lenticulars 11 are in this case in the form of convex cylindrical elements, and they act as a light output directing means to provide different images, or views, from the display panel 3 to the eyes of a user positioned in front of the display device 1.

The lenticular sheet 9 is formed as a replicated lens structure, as is known in the art. The planar surfaces of the lenses 11 are bounded by a glass substrate (not shown) which provides rigidity. The convex surfaces of the lenses 11 are bounded by a silicone filler (not shown), which filler is disposed between the lenticulars 11 and another glass substrate (not shown). The silicone filler has a refractive index which is different to that of the lenses 11, so that light which crosses the interface therebetween is refracted. The silicone filler may be replaced by an air gap in the known device 1.

The autostereoscopic display device 1 shown in FIG. 1 is capable of projecting several different perspective views in different directions. In particular, each lenticular 11 overlies a small group of display pixels 5 in each row. The lenticular 11 projects each display pixel 5 of a group in a different direction, so as to form the several different views. As the user's head moves from left to right, his/her eyes will receive different ones of the several views, in turn.

Figure 2:
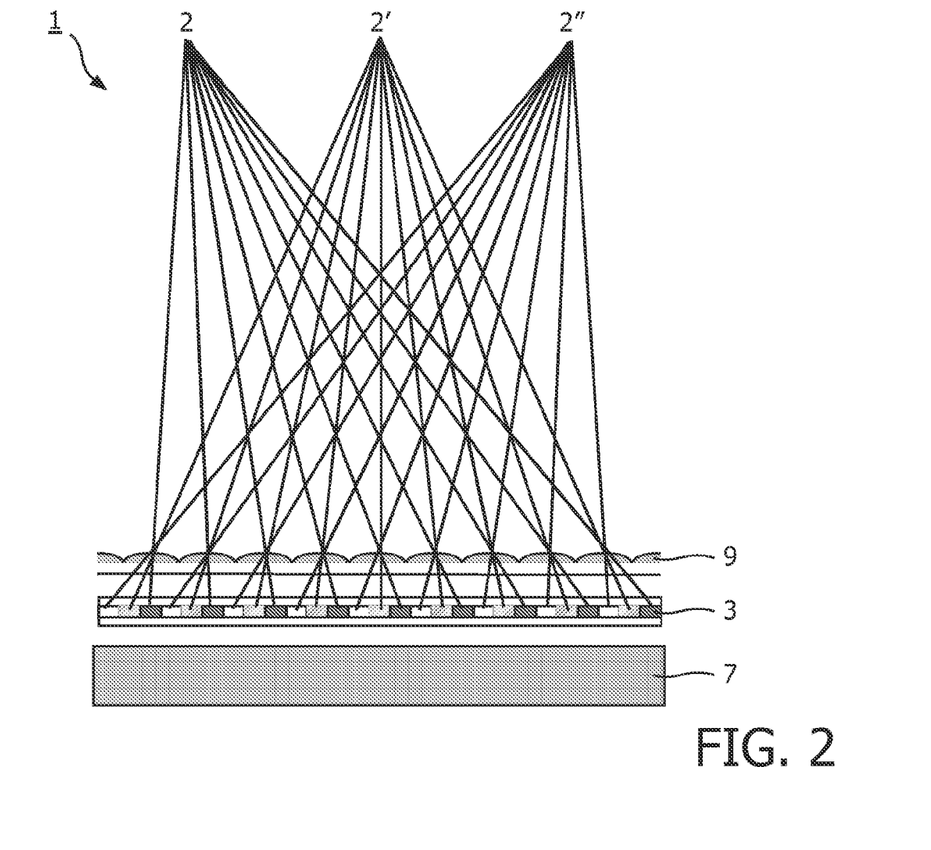
FIG. 2 is a schematic cross sectional view of the display device shown in FIG. 1 for explaining its principle of operation.

FIG. 2 shows the principle of operation of a lenticular type imaging arrangement as described above and shows the light source 7, display panel 3 and the lenticular sheet 9. The arrangement provides three views 2, 2' and 2" each projected in different directions. Each pixel of the display panel 3 is driven with information for one specific view.

The above described device provides an effective three dimensional display when the views are driven such that they contain the appropriate parallax information for the three views. It will be appreciated that the provision of stereoscopic views involves a necessary reduction in resolution, since each view is formed by a subset of the pixels of the display panel unless a time sequential display of the view can be provided. Furthermore, for a given display panel resolution, there is a trade off between the realistic perception of three dimensional depth, as determined by the number of views, and the resolution of each of the views.

Figure 3:
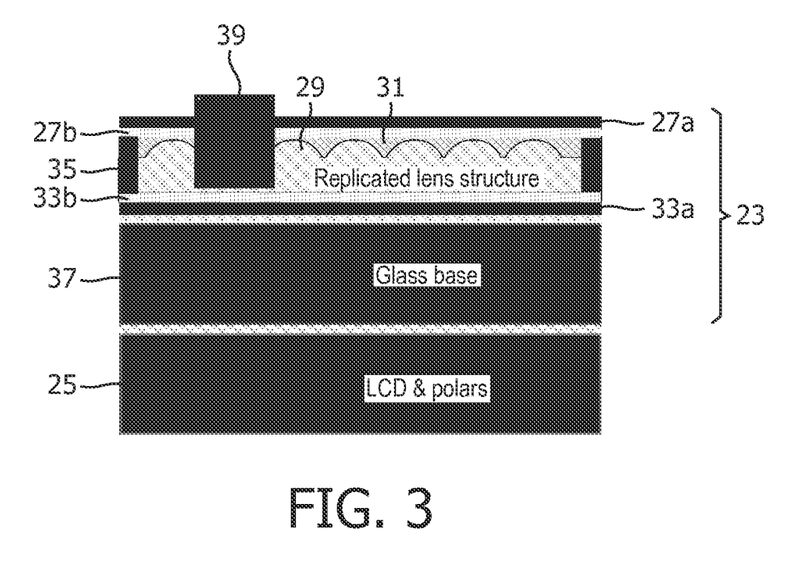
FIG. 3 is a schematic cross sectional view showing a view forming arrangement on which the invention is based.
Figure 4:
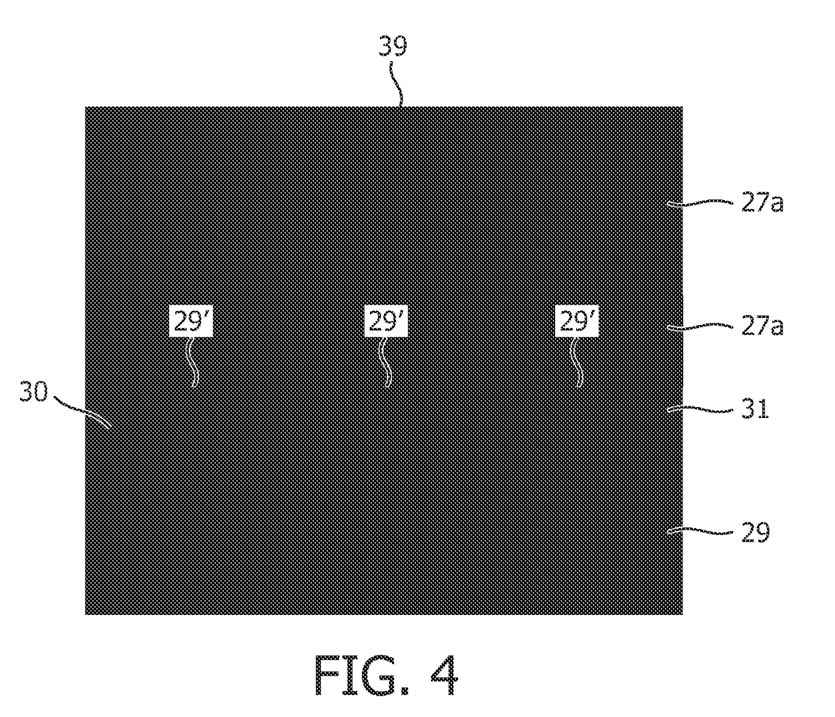
FIG. 4 is a view showing a portion of FIG. 3 in greater detail.

FIGS. 3 and 4 are schematic cross sectional views showing a display device which includes a switchable view forming arrangement 23 on which an embodiment of the invention is based. The view forming arrangement 23 is switchable in use to enable the display device to function as both a conventional two dimensional display device and an autostereoscopic display device. In such a device, the view forming arrangement is essentially switched between two modes: a pass through mode for providing a high resolution display and a view forming mode for providing an autostereoscopic display. In the pass-through mode no optical beam directing takes place while in the view forming mode, beam directing takes place.

Thus, the display device of FIG. 3 is similar to the known device 1 shown in FIGS. 1 and 2 in that it comprises a backlight (not shown) and a conventional liquid crystal display panel 25 which functions as an image forming means. By virtue of the operating principle of the LCD display panel 25, its light output has a predetermined polarization.

In the display of FIG. 3, the lenticular sheet 9 (see FIGS. 1 and 2) is replaced with a view forming arrangement 23. The view forming arrangement 23 shown in FIGS. 3 and 4 comprises first and second view forming layers 29 and 31 which are sandwiched between first and second substrates 27a, 27b and 33a, 33b. The first layer 29 is formed of an optically isotropic material. The first layer 29 has an optical beam deflection surface 30 (a lens surface) with multiple curved surfaces 29' facing towards the first substrate 27a, 27b and a flat substrate surface facing towards the second substrate 29a, 29b. The second layer 31 is formed of a birefringent liquid crystal material and effectively fills a space between the first substrate 27a, 27b and the first layer 29.

The first and second substrates 27a, 27b, 33a, 33b each comprise a film 27a, 33a and a transparent electrode layer 27b, 33b formed of indium tin oxide (ITO). The electrode layers 27b, 33b face towards each other for applying an electric field across the second layer 31. A surface of the first substrates 27a, 27b which contacts the liquid crystal material of the second electrode layer 31 is also provided with alignment microstructures in the form of a mechanically rubbed polymer surface (not shown). The alignment microstructures serve to align the liquid crystal material with a first orientation, as described herein below. For this purpose the well known polyimide rubbing layers may be used.

Seal lines 35 are provided at the edges of the view forming arrangement 23 to further confine the liquid crystal material of the second view forming layer 31. The components of the view forming arrangement 23 described above in this case are laminated to a rigid glass substrate 37 which provides support. In manufacture of the arrangement 23, the flexible structure can be processed by roll-to-roll techniques prior to lamination of the glass substrate.

FIG. 4 shows a portion 39 of the first substrate 27a, 27b and the first and second layers 29, 31 in greater detail. The interface between the first and second layers 29, 31 defines a plurality of parallel lenticular lenses that are defined by the curved surfaces 29' which can function as a view forming means in the conventional manner; that is, by focusing the light received from the display panel 25 into a plurality of views which are projected in respective different directions (see above and e.g. the FIGS. 1 and 2).

The refractive index of the optically isotropic first view forming layer 29 is substantially fixed for all light polarization directions. In contrast, for light having a predetermined polarization direction, the refractive index of the birefringent liquid crystal material of the second layer 31 depends on its molecular orientation. In a first orientation, which is induced by the alignment microstructures of the first substrate 27a, 27b and first layer 29, the refractive index for light having the predetermined polarization (the ordinary refractive index) is matched to the fixed refractive index of the first layer 29. In a second orientation, which is induced by applying an electric field across the liquid crystal material using the electrodes layers 27b, 33b, the refractive index for light having the predetermined polarization (the extraordinary refractive index) is less than the fixed refractive index of the first layer 29.

By using the optical beam directing arrangement as the view forming arrangement 23 with the polarized light output from the display panel 25, and by appropriately controlling the orientation of the liquid crystal material of the second layer 31, the view forming function can be switched on and off; that is, the view forming arrangement 23 can be switched between a pass through mode and a view forming mode.

A more detailed description of such autostereoscopic displays can be found in U.S. Pat. No. 6,064,424 and U.S. Pat. No. 6,069,650.

It can be seen in FIG. 4 that the first substrate 27a, 27b contacts a portion of the lens surface of the first layer 29. As a consequence, the lens surface is not entirely surrounded by the liquid crystal material of the second view forming layer 31. In addition in the direct vicinity of the contact area there are regions where the liquid crystal layer is very thin. It is known that thin layers are difficult to switch. This effect is not limited to liquid crystal layers and is due to differences between bulk and surface properties of materials. These contact areas may lead to optical defects in use of the view forming arrangement 23, since localized areas of the arrangement 23 cannot be effectively switched between the pass through and view forming modes. Hence it has been recognized that there is a need for reduction of this kind of areas across the display screen area.

Preferably one thus wants to remove the contacts by e.g. increasing the spacing between the lenses and the first substrate. However, stability of the entire arrangement will then be compromised as the substrate will now not be supported by the lenses over a large area. This problem is especially severe when the substrate layers need to be thin and or part or the whole of the arrangement are made of flexible materials such as plastics for cost and/or weight considerations. Thus preferably the first layer 29 and/or layers 27a and 27b and/or layers 33a and 33b are made of such plastics. Deformations will easily occur inducing contact between the lenses that may be visible again. Sticking my even occur. The invention provides a way of reducing the visible contact areas through introduction of spacers as supporting members. These spacers may be specifically oriented or shaped in order to reduce non-switching areas across the display screen area.

Figure 5A:
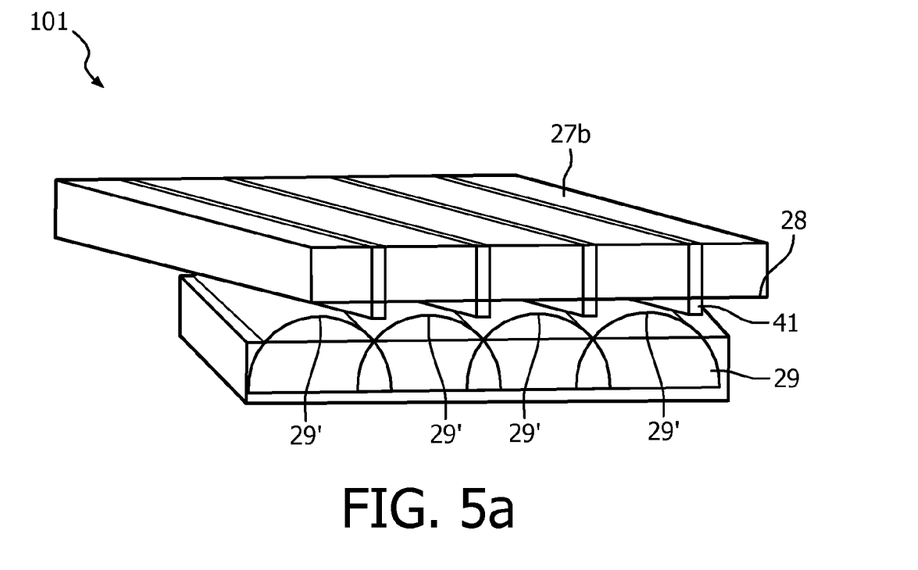
FIGS. 5a and 5b are schematic views of the configuration of a first view forming arrangement according to the invention.
Figure 5B:
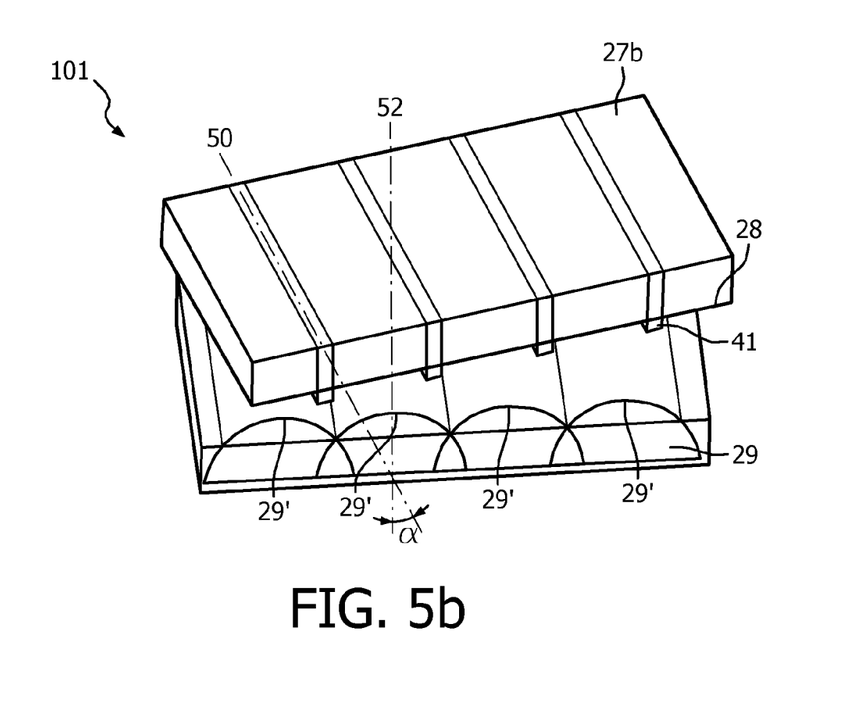

In order to describe the optical beam directing arrangement of the invention the device shown in FIGS. 3 and 4 is used as an example with the necessary adjustments. A first embodiment is shown in FIGS. 5a and 5b in which embodiment the spacers extend from the substrate surface 27a, 27b. FIGS. 5a and 5b are schematic views. The Figs show the first substrate 27a, 27b and the first layer 29; the other components of the arrangement are essentially the same as illustrated in FIG. 3.

In the first configuration 101, linear elongate spacers 41 are extended from the first substrate 27a, 27b and make point contact with the first layer 29. The spacers 41 are provided as a patterned structural layer which is formed over the electrode layer 27b. The structural layer is formed of a dielectric material, so that the spacers 41 do not become a functional part of the electrode layer 27b. Other configurations for providing such spacers may be possible.

The spacers 41 extend in a direction parallel to the alignment microstructures (not shown) which are provided for aligning the liquid crystal material of the second view forming layer 31. In this way, also the alignment microstructures can be conveniently formed by mechanical rubbing after the spacers 41 have been formed.

The elongate spacers 41 have a square cross section with a height as measured from their base which in this case is at the substrate surface 28 and a width perpendicular to the height and perpendicular the long axis 50 of the spacers. The width of the spacers 41 is significantly smaller than the width of the lenticulars. The elongate spacers and the mechanical axes 52 of the lenticular lenses defined by the curved surfaces 29' define an angle of approximately 30 degrees measured in the plane of the surface 28. In this way, each spacer 41 contacts more than one of the lenticulars, but the point contact areas are still minimized. The effect is that with simple structure and orientation easy fabrication is obtained that results in robust sandwich layer of substrate and first layer. Contact will always be made and spaces will not be drawn into the pits between lenticulars upon small mechanical mismatch of position.

It will be clear that other angles may be chosen with equal effect. While smaller angles induce larger contact lines they reduce the number of contact areas. The exact configuration chosen may depend on the flexibility of the materials of the layers of the optical beam deflection device. The more flexible, the more contact areas may be needed. Furthermore, the shape and width 14 (see FIG. 1 for definition) of the lenticulars is also of influence to the number of contacts and the angle needed to contact at least two neighboring lenticulars.

The spacers need not be continuous in the direction of their length. At those positions where there is no contact foreseen they may be absent. This may further reduce optical defects. They may be present in certain patterns across the substrate surface.

The lenticular lens array may have mutually identical lenticular lenses having identical curved surfaces. In that case the spacers may all be of equal geometry. Alternatively, lenticular lenses may not all be mutually identical. They may differ with respect to their curvature and/or their height and/or width. The differences may occur regularly across the lenticular array in one or more directions in which the plane of the lenticular lens array extends, i.e. for example parallel to the plane of the substrate. As a consequence, spacers may be configured to contact only a subset of the lenticular lens curved surfaces that are mutually equal. Preferably the contact is on the top of the curved surfaces. In one variation all contacts are with the subset of curved surfaces closest to the substrate surface 28. Again in this case all spacers may have the same geometry in order to arrive at a uniform spacing of substrate and first layer 29. Alternatively, the spacers may contact any other of the subsets or combinations. This will require that spacers be discontinuous or have different height at different positions in order to arrive at the uniform spacing of the substrate and first layer.

Figure 6A:
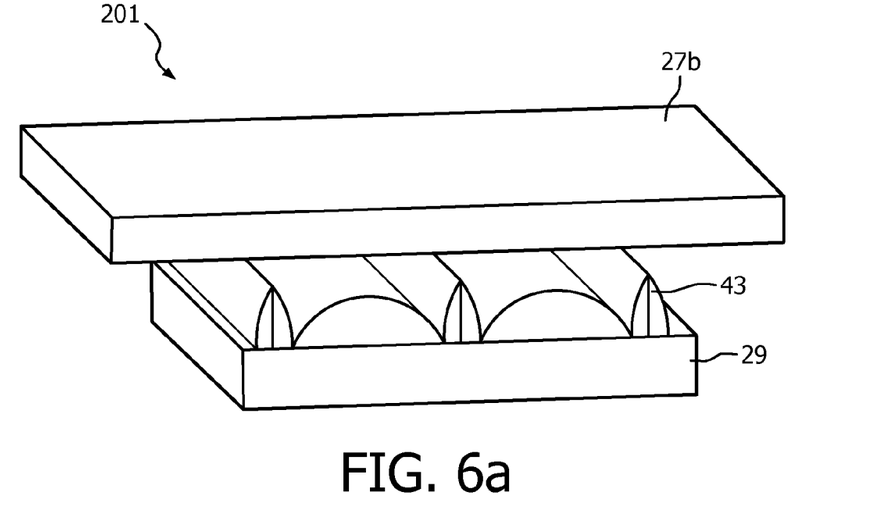
FIGS. 6a and 6b are schematic views of the configuration of a second view forming arrangement according to the invention.
Figure 6B:
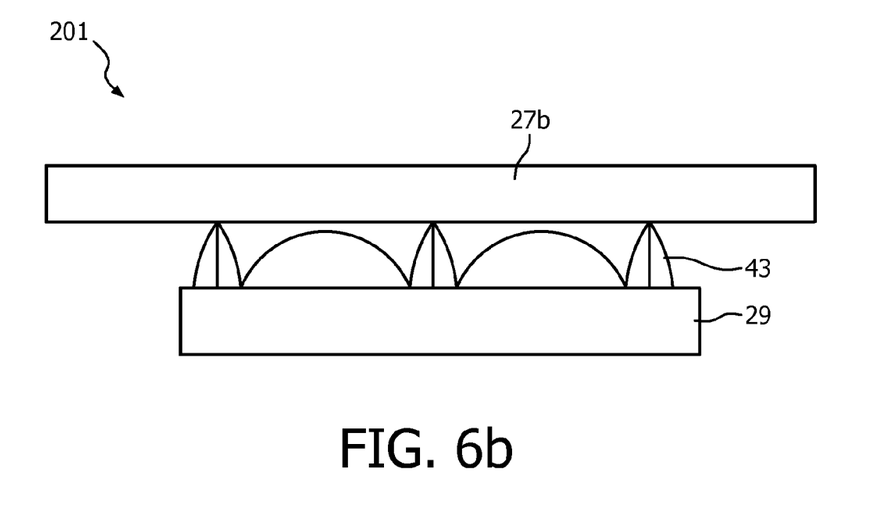

FIGS. 6a and 6b are schematic views of the configuration 201 of a second view forming arrangement according to the invention. Again, the Figs show the first substrate 27a, 27b and the first view forming layer 29; the other components of the arrangement are essentially the same as illustrated in FIG. 3.

In this configuration 201, the spacers 43 are extended from, and integrally formed with, the first view forming layer 29. The spacers 43 are arranged between adjacent ones of the lenticulars, but do not form a part of a lenticular surface. The spacers 43 extend in a direction parallel to the lenses.

The cross sectional shape of the spacers 43 has tapered side walls and terminates in a point, such that the spacers make line contact with the first substrate 27a, 27b. The spacers 43 have a width significantly smaller than the width of the lenticulars.

Figure 7A:
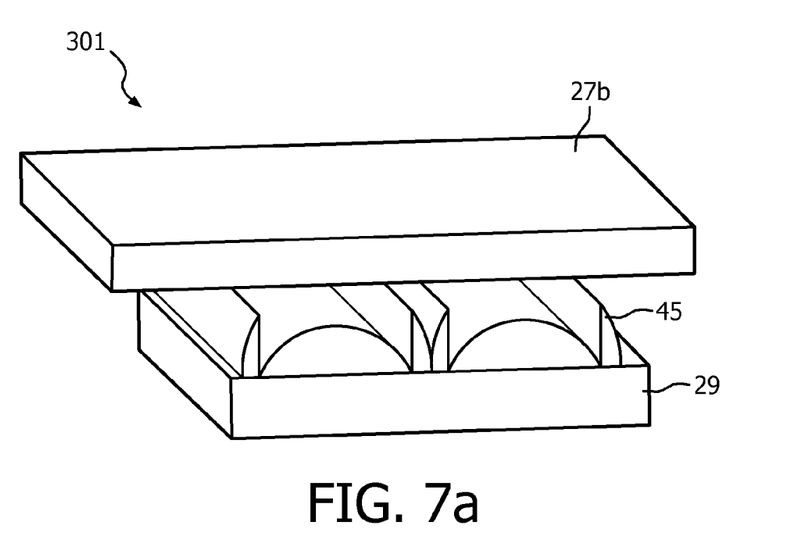
FIGS. 7a and 7b are schematic views of the configuration of a third view forming arrangement according to the invention.
Figure 7B:
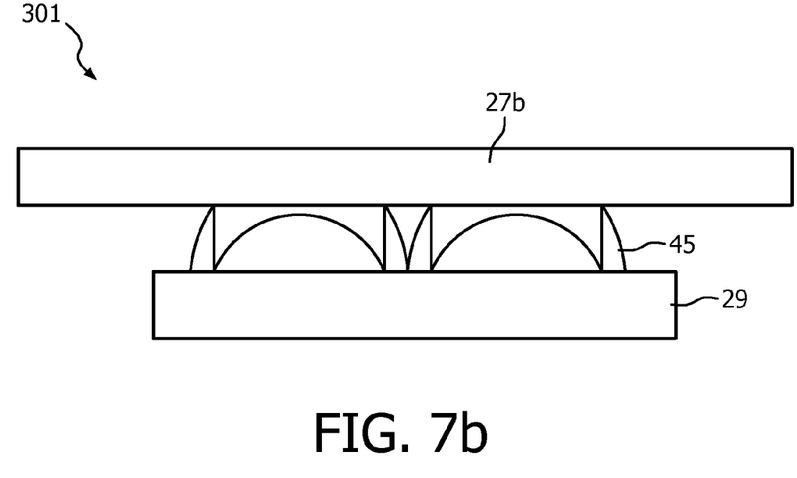
Figure 8A:
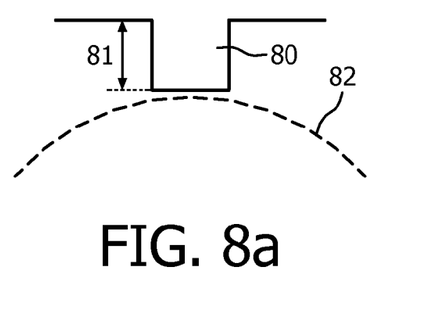
FIG. 8 is a schematic view of an autostereoscopic display device which includes a view forming arrangement according to the invention.
Figure 8B:
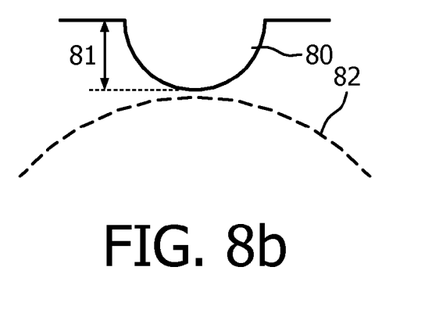
Figure 8C:
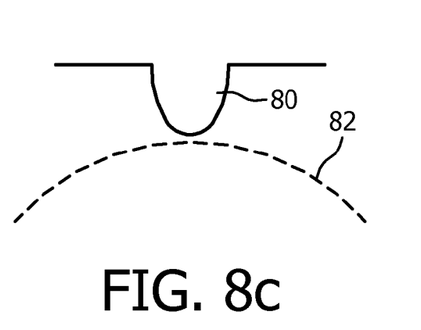
Figure 8D:
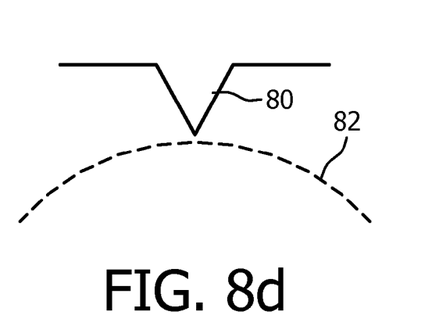
Figure 8E:
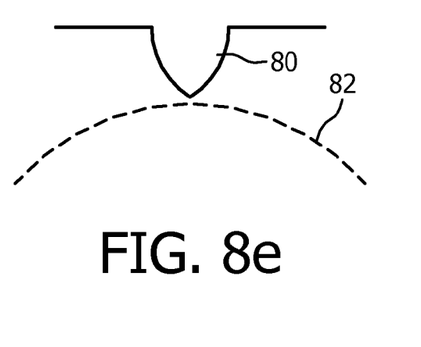
Figure 8F:
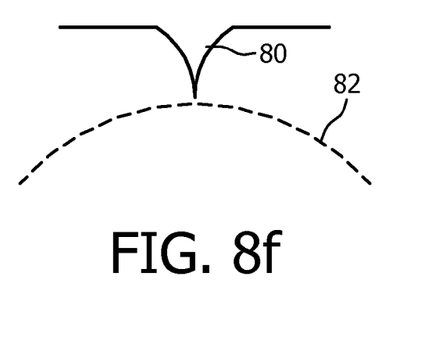

FIGS. 7a and 7b are schematic views of the configuration 301 of a third view forming arrangement according to the invention. The configuration 301 is similar to the configuration 201 shown in FIGS. 6a and 6b, except that the spacers 45 have a different cross sectional shape.

FIGS. 8A to 8F show cross sections of spacers that are beneficial for spacing the substrate from the lenses of the first layer. Each of the figures shows the spacer 80 having a height 81 (indicated for only two of the sub figures). Also curved surfaces 82 of lenticular lenses are shown. The spacers have a width measured in the plane of drawing perpendicular to the height. It will be evident that for spacers for which the width measured at their base is the same, the contact areas where switching is difficult will decrease upon going from FIGS. 8A, to 8B with circular cross section, to FIG. 8C with more than circular (e.g. parabolic) cross section to FIG. 8E with sharp tip (Hertz contact) and rounded sides to FIG. 8D with triangular cross section with Hertz contact to FIG. 8E with Hertz contact and concave sides.

The shapes for FIGS. 8A to F may provide the advantage alone, but in particular with the spacers making an angle with the lenticular lenses such as in FIGS. 5a and 5b.

Figure 9:
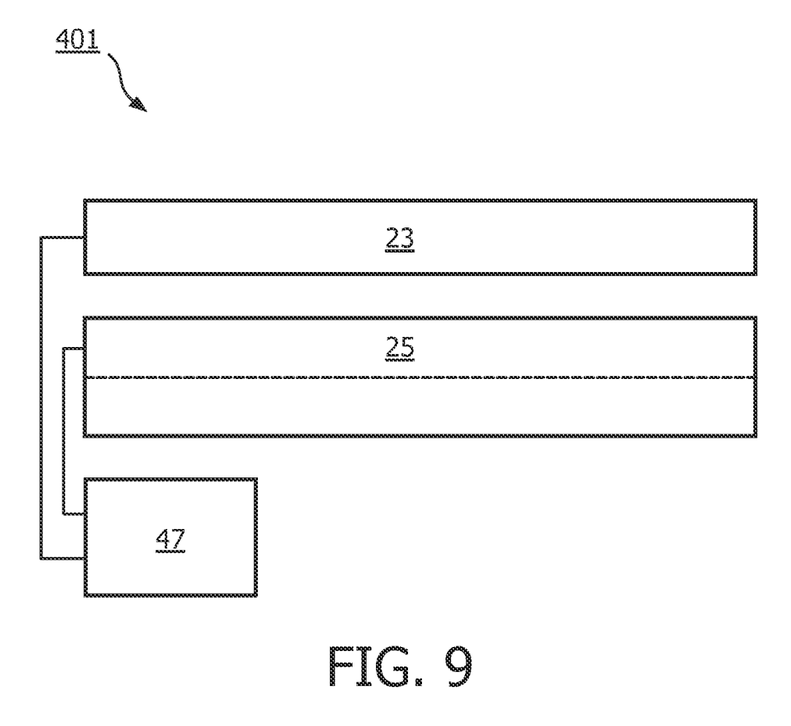

FIG. 9 is a schematic view of an autostereoscopic display device 401 which includes a view forming arrangement 23 having one of the configurations according to the invention 101, 201, 301 described hereinabove.

The display device 401 comprises a conventional backlit liquid crystal display panel 25 which functions as an image forming means. The view forming arrangement 23 is arranged over and in registration with the display panel 25.

The device 401 also includes a controller 47 which, in use, provides display data to the display panel 25 and controls the mode of the view forming arrangement 23. In a first mode, in which there is no electric field across the first view forming layer 31, the view forming arrangement 23 operates in a pass through mode and the display panel 25 is provided with two dimensional display data. In a second mode, in which an electric field is provided across the first view forming layer 31, the view forming arrangement 23 operates in a view forming mode and the display panel 25 is provided with three dimensional (multiple view) display data.

Specific embodiments of the invention have been described above. Variations to the disclosed embodiments can be understood and effected by those skilled in the art in practicing the claimed invention, from a study of the drawings, the disclosure, and the appended claims.

For example, instead of a convex lens surface, the first view forming layer may instead be provided with a concave lens surface. In this case, spacers extended from the substrate may contact the cusps of the lenticulars.

The lenticular lenses may be semi-cylindrical circularly curved or curved with other shapes. These lenticular lenses may be continuous across the entire display in their cylinder axis direction. However, they may also be discontinuous possibly overlying e.g. a certain number of pixels defining the number of views of the autostereoscopic display. The lenticular lenses may be curved in two independent directions.

The optical beam deflection arrangement of the invention may be suitable for applications other than autostereoscopic displays, such as electrophoretic systems.

Hereinabove, the autostereoscopic display provides one example of a multiview display. It is capable of providing one or more viewers each with multiple views such that each of them can be provided with parallax information and be given a stereoscopic viewing experience.

Another example of a multiview display is one in which multiple viewers can see entirely different information be it both 2D, or even 3D and both. Such multiview displays are often referred to as Dual view or split screen displays. An example of such a dual view display would resemble the one shown in the FIG. 2, with this difference that pixels and lenses are now organized such that the pixel information of each of the pixels is directed into either a view on the left side within the entire field of view of the display or into the view on the right side of this field of view. For example each pair of neighboring two columns of pixels (sub-pixels for color display) may be overlain with one lens 9 to achieve this. Thus each view is provided with information from a subset of pixels from the entire area of the display panel. One application of such a display may be a computer monitor suitable for gaming. Two players may then enjoy their perspective of a game on the entire display are instead of only on half of the area of the display. Alternatively, such a display may be used in the console of a car or other vehicle where space is limited and two viewers desire to be provided with different information. The driver may thus be provided with traffic information while the passenger next to him may enjoy a movie, internet or other entertainment. A more detailed description of the operating principle and the possible construction of such dual view displays especially with lenses as the view forming elements is disclosed in U.S. Pat. No. 7,365,707.

Preferably such displays area also provided with a switchable view forming arrangement. In dual view mode, both viewers may have half the display pixel resolution at their disposal. In single view mode, where no view forming is necessary, the full pixel resolution is available. The present invention is equally well applicable in such displays with all its advantages.

In the above examples of multiview display devices, the display panels were LCD based panels, i.e. transmissive panels. However, without loss of advantage, for the present invention, such panels may equally well be emissive panels such as Light emitting diode (LED) or Organic Light emitting diode (OLED) panels or reflective LCD, LED or OLED panels.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope of the claims.

The invention claimed is:

1. A multi-view display device for providing multiple views to one or more viewers, the device comprising:
   an image forming arrangement having an array of display pixels for producing a display; and
   an optical beam deflection arrangement arranged in registration with the image forming arrangement such that light from different pixels is directed by the optical beam deflection arrangement into different ones of the multiple views,
   wherein the optical beam deflection arrangement comprises:
      a substrate formed of a solid material having a substrate surface;
      a first layer formed of an optically transparent solid material, having a first refractive index and having an optical beam deflection surface at least partly defined by a plurality of curved surfaces;
      a second layer of a gaseous and/or liquid material confined between the substrate surface and the optical beam deflection surface, and having a second refractive index, wherein the second refractive index is different from the first refractive index,
   wherein the substrate surface is spaced from the deflection surface by a plurality of spacers which are extended from the substrate and/or from the first layer,
   wherein the spacers make point and/or line contact with one or more first portions of the other one of the substrate surface and the optical beam deflection surface,
   wherein the spacers are elongate having a length and width perpendicular to the length, where the spacer length and spacer width extend in a plane parallel to the plane of the substrate,
   wherein each spacer makes direct contact with at least two different curved surfaces, and
   wherein the curved surfaces contact each other at lines of contact that are substantially parallel and at an angle between 2 and 80 degrees to a direction of the lengths of the spacers.

2. The display device of claim 1, wherein the substrate and/or the first layer are formed of flexible materials.

3. The display device of claim 1, wherein the second layer comprises or consists of the liquid material and wherein the liquid material has a further refractive index different from the second refractive index, the further refractive index matching the first refractive index of the first layer.

4. The display device of claim 1, wherein each of the first portions of the curved surfaces is spaced from the substrate surface with a minimum local distance for that curved surface, and wherein the spacers are extending from the substrate so that for a first subset of the curved surfaces the direct contact occurs in the first portions of the curved surfaces of the first subset.

5. The display device of claim 4, wherein the minimum local distance is the same as the minimum spacing distance between the substrate surface and a first portion of a curved surface of the optical beam deflection surface.

6. The display device of claim 1, wherein the first subset of curved surfaces comprises curved surfaces that are mutually identical.

7. The display device of claim 1, wherein the plurality of curved surfaces is arranged in a regular array in a first array direction which is parallel to the substrate surface.

8. The display device of claim 1, wherein each of the curved surfaces is the surface of a semi cylindrical lens having a cylinder axis, all cylinder axes of the lenses being substantially parallel.

9. The display device of claim 1, wherein the image forming arrangement has a black matrix and wherein the spacers are at least partly positioned on top of the black matrix.

10. The display device of claim 1, wherein the angle between the lines of contact and the direction of the length of the spacers is greater than 15 degrees.

11. The display device of claim 1, wherein each spacer is optically transparent so that the visibility of the contacts to the curved surface is minimized.

12. The display device of claim 1, wherein the contacts to the curved surface form "Hertz" contacts.

13. The display device of claim 1, wherein the width of the spacers is less than 10% of a distance between adjacent lines of contact.

14. The display device of claim 1, wherein the second layer comprises a liquid crystal material, and surfaces of the substrate and/or second layer that are in contact with the liquid crystal material include alignment microstructures for aligning an optical axis of the liquid crystal material in a predetermined orientation.

15. A display device comprising:
an image forming arrangement having an array of display pixels for producing a display; and
an optical beam deflection arrangement arranged in registration with the image forming arrangement such that light from different pixels is directed by the optical beam deflection arrangement into different ones of the multiple views,
the optical beam deflection arrangement comprising:
an optically transparent substrate having substantially parallel first and second substrate surfaces, wherein the light enters the substrate through the first substrate surface and exits through the second substrate surface;
a first layer formed of an optically transparent solid material, having a first refractive index and having an optical beam deflection surface at least partly defined by a plurality of curved surfaces;
a second layer of a gaseous and/or liquid material confined between the first substrate surface and the optical beam deflection surface, and having a second refractive index that is different from the first refractive index;
wherein the substrate surface is spaced from the deflection surface by a plurality of spacers that are extended from the substrate and/or from the first layer; and
wherein the display pixels are arranged in a horizontal direction and a vertical direction, the elongate spacers are arranged parallel to one of the horizontal or vertical directions, and lines of contact of the plurality of curved surfaces are arranged substantially parallel to a line that is offset from both the horizontal and vertical direction of the array of display pixels.

16. The display device of claim 15, wherein each spacer is optically transparent so that the visibility of the contacts to the curved surface is minimized.

17. The display device of claim 15, wherein the second layer comprises liquid crystal material having a further refractive index different from the second refractive index, the further refractive index matching the first refractive index of the first layer.

18. A display device comprising:
an image forming arrangement having an array of display pixels for producing a display; and
an optical beam deflection arrangement arranged in registration with the image forming arrangement such that light from different pixels is directed by the optical beam deflection arrangement into different ones of the multiple views,
the optical beam deflection arrangement comprising:
an optically transparent substrate having substantially parallel first and second substrate surfaces, wherein the light enters the substrate through the first substrate surface and exits through the second substrate surface;
a first layer formed of an optically transparent solid material, having a first refractive index and having an optical beam deflection surface at least partly defined by a plurality of curved surfaces;
a second layer of a gaseous and/or liquid material confined between the first substrate surface and the optical beam deflection surface, and having a second refractive index that is different from the first refractive index;
wherein the substrate surface is spaced from the deflection surface by a plurality of elongate spacers that are extended from the substrate and/or from the first layer; and
wherein the display pixels are arranged in a horizontal direction and a vertical direction, lines of contact of the curved surfaces are arranged parallel to one of the horizontal or vertical directions, and the elongate spacers are arranged substantially parallel to a line that is offset from both the horizontal and vertical direction of the array of display pixels.

19. The display device of claim 18, wherein each spacer is optically transparent so that the visibility of the contacts to the curved surface is minimized.

20. The display device of claim 18, wherein the second layer comprises liquid crystal material having a further refractive index different from the second refractive index, the further refractive index matching the first refractive index of the first layer.

* * * * *